(12) United States Patent
Hayashizaki et al.

(10) Patent No.: US 9,765,675 B2
(45) Date of Patent: Sep. 19, 2017

(54) EXHAUST GAS PURIFIER

(71) Applicant: HINO MOTORS, LTD., Hino-shi (JP)

(72) Inventors: Keiichi Hayashizaki, Tokyo (JP); Shinya Sato, Tokyo (JP); Hiroshi Hirabayashi, Tokyo (JP); Mitsuru Hosoya, Tokyo (JP)

(73) Assignee: HINO MOTORS, LTD., Hino-shi (JP)

( * ) Notice: Subject to any disclaimer, the term of this patent is extended or adjusted under 35 U.S.C. 154(b) by 132 days.

(21) Appl. No.: 14/763,411

(22) PCT Filed: Dec. 25, 2013

(86) PCT No.: PCT/JP2013/007575
§ 371 (c)(1),
(2) Date: Jul. 24, 2015

(87) PCT Pub. No.: WO2014/115228
PCT Pub. Date: Jul. 31, 2014

(65) Prior Publication Data
US 2015/0352496 A1    Dec. 10, 2015

(30) Foreign Application Priority Data
Jan. 24, 2013   (JP) .................................. 2013-010705

(51) Int. Cl.
*B01D 50/00*    (2006.01)
*F01N 13/00*    (2010.01)
(Continued)

(52) U.S. Cl.
CPC ....... *F01N 13/0097* (2014.06); *B01D 53/944* (2013.01); *B01D 53/9431* (2013.01);
(Continued)

(58) Field of Classification Search
CPC ....... F01N 3/0814; F01N 3/36; B01D 53/944; B01D 53/9495; B01D 2255/102; B01D 2255/20761
(Continued)

(56) References Cited

U.S. PATENT DOCUMENTS

2007/0125072 A1\* 6/2007 McCarthy ............. F01N 3/0885
60/286
2008/0069743 A1   3/2008 Castellano et al.
(Continued)

FOREIGN PATENT DOCUMENTS

DE   10 2009 039 512 A1   4/2010
EP        2 503 121 A1   9/2012
(Continued)

OTHER PUBLICATIONS

International Search Report Issued Feb. 10, 2014 in PCT/JP13/007575 Filed Dec. 25, 2013.
(Continued)

*Primary Examiner* — Tom P Duong
(74) *Attorney, Agent, or Firm* — Oblon, McClelland, Maier & Neustadt, L.L.P.

(57) ABSTRACT

Incorporated in an exhaust pipe are an HC-SCR $NO_x$ catalyst capable of reducing $NO_x$ at temperatures less than a set temperature T and a catalyzed particulate filter with an oxidation catalyst capable of reducing $NO_x$ at temperatures not less than the set temperature T. When an exhaust gas temperature is less than the set temperature T, fuel with a set flow rate Q is intermittently added from a fuel addition unit on an entry side of the HC-SCR $NO_x$ catalyst to the HC-SCR $NO_x$ catalyst; when the exhaust gas temperature is not less than the set temperature T, the fuel with flow rate Q' not less than the set flow rate Q is temporarily rich-spike added from the fuel addition unit and is made arrival at a catalyzed
(Continued)

particulate filter. With an active temperature range being expanded, exhaust emission control is performed in a wide temperature range.

3 Claims, 6 Drawing Sheets

(51) Int. Cl.
   *F01N 3/36* (2006.01)
   *F01N 3/035* (2006.01)
   *B01D 53/94* (2006.01)
   *F01N 3/08* (2006.01)

(52) U.S. Cl.
   CPC ..... *B01D 53/9477* (2013.01); *B01D 53/9495* (2013.01); *F01N 3/035* (2013.01); *F01N 3/0814* (2013.01); *F01N 3/36* (2013.01); *B01D 2251/208* (2013.01); *B01D 2255/102* (2013.01); *B01D 2255/104* (2013.01); *B01D 2255/20761* (2013.01); *Y02T 10/24* (2013.01)

(58) Field of Classification Search
   USPC .................................................. 422/171, 177
   See application file for complete search history.

(56) References Cited

U.S. PATENT DOCUMENTS

| | | | |
|---|---|---|---|
| 2008/0124264 A1* | 5/2008 | Ikeda | B01J 23/44 423/213.5 |
| 2010/0050616 A1 | 3/2010 | Lee et al. | |
| 2013/0315790 A1 | 11/2013 | Bisaiji et al. | |

FOREIGN PATENT DOCUMENTS

| | | |
|---|---|---|
| JP | 2001-329829 A | 11/2001 |
| JP | 2003-247418 A | 9/2003 |
| JP | 2004-204700 A | 7/2004 |
| JP | 2009-19556 A | 1/2009 |
| JP | 2012-87703 A | 5/2012 |
| JP | 2012-92690 A | 5/2012 |
| KR | 10-2009-0075692 A | 7/2009 |
| WO | 2012/108059 A1 | 8/2012 |

OTHER PUBLICATIONS

Extended European Search Report issued Sep. 2, 2016 in Patent Application No. 13872671.6.

* cited by examiner

FIG. 3A TEMPERATURE LESS THAN SET TEMPERATURE (300°C)

FIG. 3B TEMPERATURE NOT LESS THAN SET TEMPERATURE (300°C)

EXHAUST GAS PURIFIER

TECHNICAL FIELD

The present invention relates to an exhaust emission control device.

BACKGROUND ART

Conventionally, some diesel engines are provided with an HC-SCR $NO_x$ catalyst (HC-SCR: HydroCarbon-Selective Catalytic Reduction) incorporated in an exhaust pipe for flow of exhaust gas and having an enhanced reaction selectivity capable of selectively reacting $NO_x$ (nitrogen oxides) with HC (hydrocarbon) as a reducing agent even in the presence of oxygen. A required amount of fuel is added upstream of the HC-SCR $NO_x$ catalyst in a direction of exhaust flow to make reductive reaction, on the HC-SCR $NO_x$ catalyst, of HC decomposionally produced from the fuel with $NO_x$ in the exhaust to thereby make reduction of $NO_x$ emission.

Figure 1:
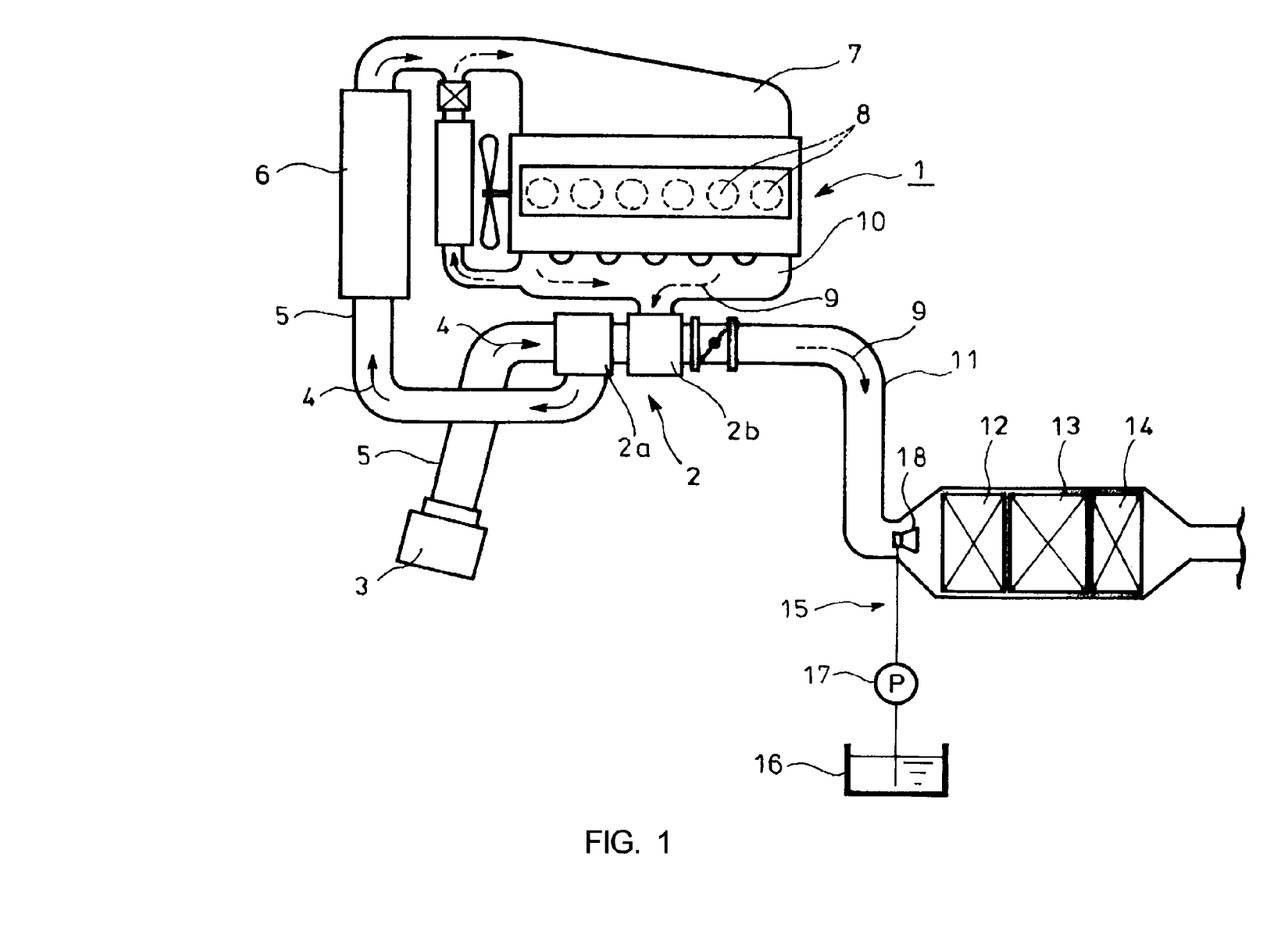
FIG. 1 is an overall schematic diagram showing an example of a conventional exhaust emission control device.

FIG. 1 shows an example of a conventional exhaust emission control device in which reference numeral 1 denotes a diesel engine with a turbocharger 2. Intake air 4 from an air cleaner 3 is passed through an intake air pipe 5 to a compressor 2a of the turbocharger 2. The intake air 4 pressurized in the compressor 2a is passed to an intercooler 6 for cooling and is further introduced from the intercooler 6 to a suction manifold 7 for distribution of the air to respective cylinders 8 of the diesel engine 1 (exemplarily illustrated in FIG. 1 is a case with inline six cylinders). Exhaust gas 9 from the respective cylinders 8 of the diesel engine 1 is passed through an exhaust manifold 10 to a turbine 2b of the turbocharger 2. The exhaust gas having driven the turbine 2b is passed to the exhaust pipe 11.

Incorporated in the exhaust pipe 11 in sequence from an upstream side are a platinum-group-element HC-SCR $NO_x$ catalyst 12 having performance of oxidizing NO, a catalyzed particulate filter 13 integrally carrying an oxidation catalyst and a downstream oxidation catalyst 14. Arranged on an entry side of the HC-SCR $NO_x$ catalyst 12 is a fuel addition unit 15 for additive supply of fuel to the exhaust gas 9.

The fuel addition unit 15 comprises a fuel tank 16 for storage of the fuel, a fuel pressure pump 17 for pumping of the fuel stored in the fuel tank 16 and a fuel addition nozzle 18 for spray of the fuel pumped by the fuel pressure pump 17 to an entry side of the HC-SCR $NO_x$ catalyst 12. The fuel stored in the fuel tank 16 is pumped by the fuel pressure pump 17 to the fuel addition nozzle 18 which sprays the fuel to the exhaust gas 9 flowing through the exhaust pipe 11. In the HC-SCR $NO_x$ catalyst 12, HC decomposionally produced from the fuel is reacted with $NO_x$ in the exhaust gas 9 to thereby make emission reduction of $NO_x$.

Particulates (particulate matter) in the exhaust gas 9 are mainly constituted by carbonic soot and a SOF (Soluble Organic Fraction) of high-boiling hydrocarbons and contain a trace of sulfate (misty sulfuric acid fraction). The particulates are captured by the catalyzed particulate filter 13 integrally carrying the oxidation catalyst, and HC, CO and the like in the exhaust gas 9 are oxidatively removed by the downstream oxidation catalyst 14.

There exists, for example, Patent Literature 1 showing general state of the art pertinent to the exhaust emission control device as mentioned in the above.

CITATION LIST

Patent Literature

Patent Literature 1: JP 2009-19556A

SUMMARY OF INVENTION

Technical Problems

However, disadvantageously the exhaust emission control device using the platinum-group-element HC-SCR $NO_x$ catalyst 12 as mentioned in the above, which has an active temperature range as narrow as 150-300° C., cannot perform exhaust emission control in a wide temperature range and especially has difficulty in enhancing $NO_x$ reduction ratio at higher temperatures not lower than 300° C.

The invention was made in view of the above and has its object to provide an exhaust emission control device which can expand an active temperature range, perform exhaust emission control in a wide temperature range and enhance a $NO_x$ reduction ratio.

Solution to Problems

The invention is directed to an exhaust emission control device comprising an HC-SCR $NO_x$ catalyst incorporated in an exhaust pipe for discharge of exhaust gas from a diesel engine and capable of reducing $NO_x$ at temperatures lower than a set temperature, a catalyzed particulate filter arranged downstream of said HC-SCR $NO_x$ catalyst and integrally carrying an oxidation catalyst capable of reducing $NO_x$ at temperatures not lower than said set temperature, a downstream oxidation catalyst arranged downstream of said catalyzed particulate filter, a fuel addition unit for additively supplying the fuel to the exhaust gas on an entry side of said HC-SCR $NO_x$ catalyst, a temperature sensor for measuring a temperature at between said HC-SCR $NO_x$ catalyst and said catalyzed particulate filter and a controller for outputting a control signal to said fuel addition unit so as to intermittently additively supply fuel with a set flow rate to said HC-SCR $NO_x$ catalyst when the temperature measured by said temperature sensor is lower than the set temperature and so as to make temporary rich-spike addition of the fuel with a flow rate not lower than said set flow rate to make arrival of the fuel at said catalyzed particulate filter when the temperature measured by said temperature sensor is not lower than the set temperature.

In the exhaust emission control device, preferably said set temperature is 300° C.

In this case, said HC-SCR $NO_x$ catalyst may be a catalyst with active metal being a platinum group element, and the oxidation catalyst carried by said catalyzed particulate filter may be a catalyst with active metal being copper.

Alternatively, said HC-SCR $NO_x$ catalyst may be a catalyst with active metal being a platinum group element, and the oxidation catalyst carried by said catalyzed particulate filter may be a catalyst with active metal being silver.

Advantageous Effects of Invention

The exhaust emission control device according to the invention can exhibit excellent effects that an active temperature range can be expanded, exhaust emission control

DESCRIPTION OF EMBODIMENTS

Now, embodiments of the invention will be described in conjunction with the drawings.

FIGS. 2-5B show an embodiment of an exhaust emission control device according to the invention in which parts identical with those in FIG. 1 are represented by the same reference numerals. As shown in FIGS. 2-5B, the embodiment, which has a fundamental structure similar to that of the conventional device shown in FIG. 1, resides in that an HC-SCR $NO_x$ catalyst 12 incorporated in an exhaust pipe 11 for discharge of exhaust gas 9 from a diesel engine 1 is a catalyst capable of reducing $NO_x$ at temperatures lower than a set temperature T (300° C.), an oxidation catalyst carried by a catalyzed particulate filter 13 arranged downstream of the HC-SCR $NO_x$ catalyst 12 is a catalyst capable of reducing $NO_x$ at temperatures not lower than the set temperature T (300° C.) and a temperature sensor 19 is arranged between the HC-SCR $NO_x$ catalyst 12 and the catalyzed particulate filter 13 and is configured to output a control signal 20a to a fuel addition unit 15 for intermittent addition of the fuel with a set flow rate Q (See FIG. 3A) to the HC-SCR $NO_x$ catalyst 12 when a temperature 19a measured by the temperature sensor 19 is lower than the set temperature T (300° C.) and for temporary rich-spike addition of the fuel with a flow rate Q' not less than the set flow rate Q (see FIG. 3B) to make arrival thereof at the catalyzed particulate filter 13 when the temperature 19a measured by the temperature sensor 19 is not less than the set temperature T (300° C.).

Figure 2:
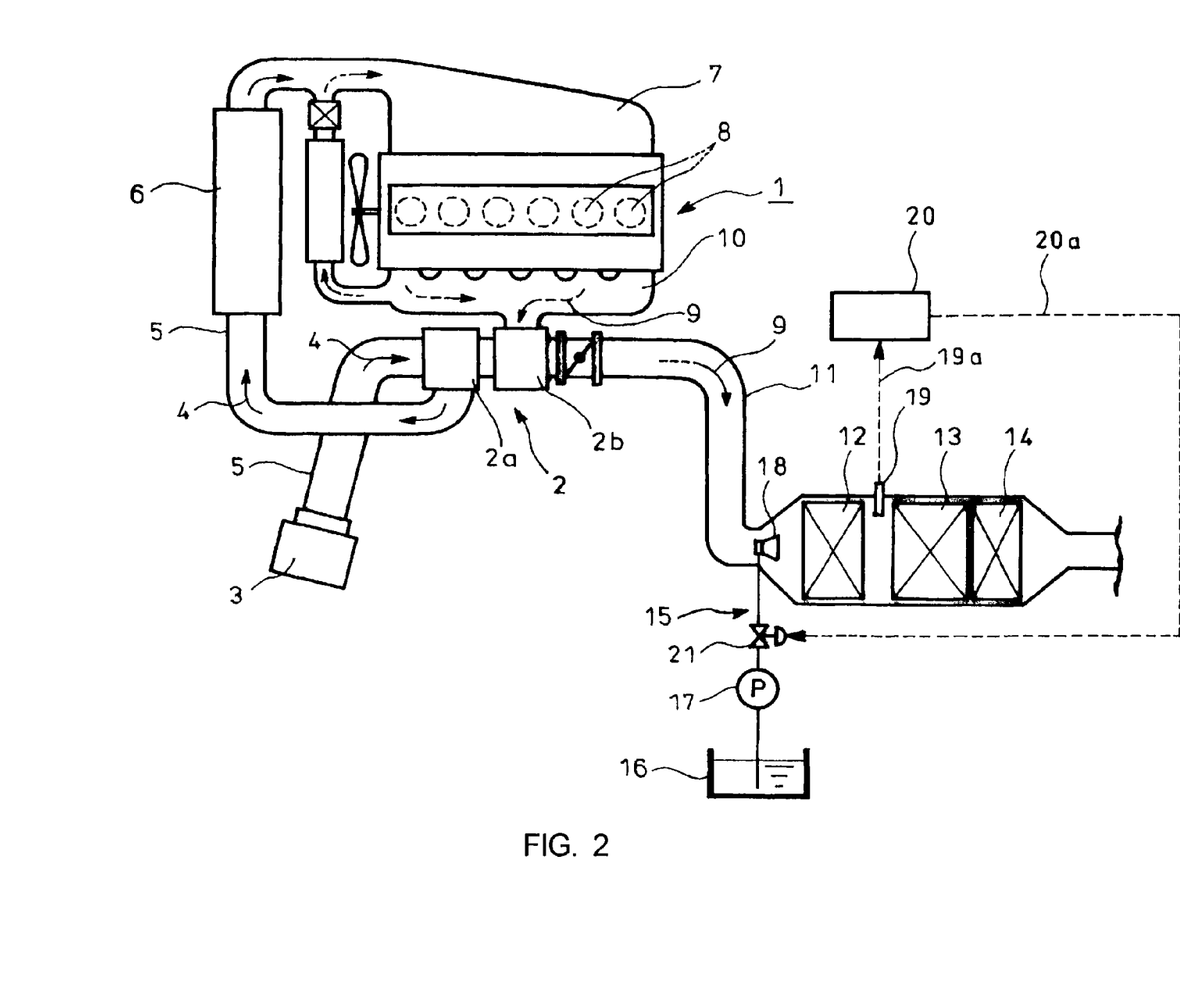
FIG. 2 is an overall schematic diagram showing an embodiment of an exhaust emission control device according to the invention.

In the embodiment, arranged on a discharge side of the fuel pressure pump 17 of the fuel addition unit 15 is a control valve 21 which is controlled in opening degree by the control signal 20a from the controller 20 so as to make the intermittent addition or the temporary rich-spike addition of the fuel.

Usable as the HC-SCR $NO_x$ catalyst 12 is a catalyst with an active metal being a platinum group element such as platinum (Pt), palladium (Pd), rhodium (Rh), ruthenium (Ru), iridium (Ir) or osmium (Os) and with a carrier being zeolite or alumina. Usable as the oxidation catalyst carried by the catalyzed particulate filter 13 is a catalyst with, for example, the active metal being a transition metal such as copper (Cu) or silver (Ag). Usable as the downstream oxidation catalyst 14 is a catalyst, similar to the HC-SCR $NO_x$ catalyst 12, with the active metal being a platinum group element and with the carrier being zeolite or alumina.

Next, an mode of operation of the above embodiment will be described.

Figure 3A:
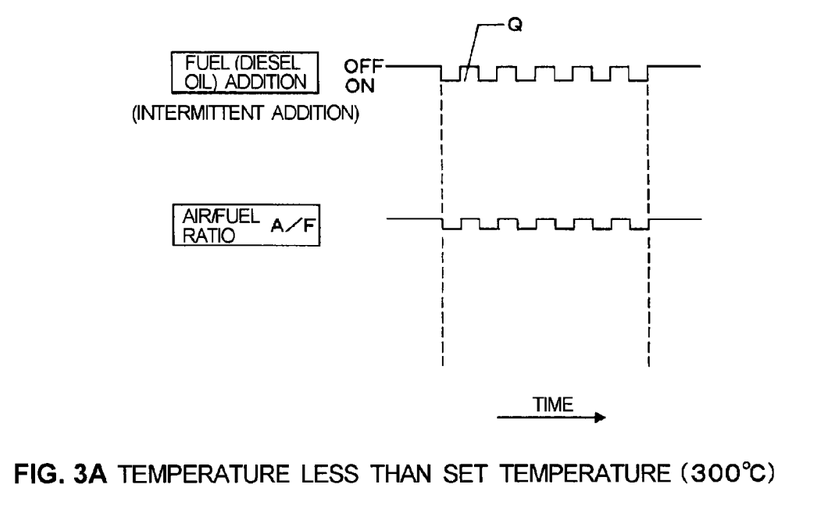
FIGS. 3A and 3B are diagrams each showing a temperature-based correspondence relationship between a fuel addition pattern and an air/fuel ratio in the embodiment of the exhaust emission control device according to the invention and each with an abscissa being a time axis, FIG. 3A being a diagram when the temperature is lower than a set temperature T (300° C.), FIG. 3B being a diagram when the temperature is not lower than the set temperature T (300° C.)

During an operation of the diesel engine 1, the temperature 19a at between the HC-SCR $NO_x$ catalyst 12 and the catalyzed particulate filter 13 is measured by the temperature sensor 19. When the temperature 19a measured by the temperature sensor 19 is lower than the set temperature T (300° C.), the control signal 20a outputted from the controller 20 to the control valve 21 of the fuel addition unit 15 controls the opening degree of the control valve 21 such that, as shown in FIG. 3A, the fuel with the set flow rate Q is intermittently added and supplied to the HC-SCR $NO_x$ catalyst 12. With such intermittent addition and supply of the fuel with the set flow rate Q to the HC-SCR $NO_x$ catalyst 12, HC decomposionally produced from the fuel is reacted with $NO_x$ in the exhaust gas 9 in the HC-SCR $NO_x$ catalyst 12, thereby making reduction of $NO_x$ emission.

Figure 3B:
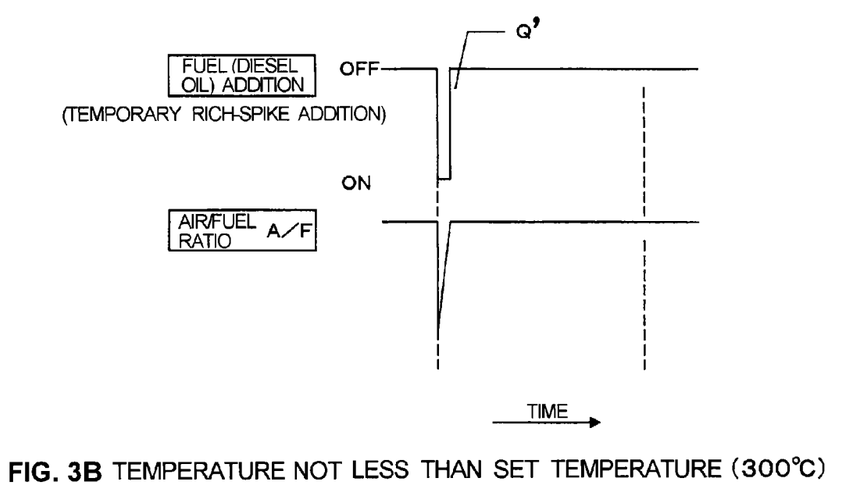

During the operation of the diesel engine 1, when the temperature 19a measured by the temperature sensor 19 is not less than the set temperature T (300° C.), the control signal 20a outputted from the controller 20 to the control valve 21 of the fuel addition unit 15 controls the opening degree of the control valve 21 such that, as shown in FIG. 3B, the fuel with the flow rate Q' not less than the set flow rate Q is temporarily rich-spike added. With such temporary rich-spike addition of the fuel with the flow rate Q' not less than the set flow rate Q, reliably the fuel is passed through the HC-SCR $NO_x$ catalyst 12 and is made arrival at the catalyzed particulate filter 13 where HC decomposionally produced from the fuel is reacted with $NO_x$ in the exhaust gas 9 to make reduction of $NO_x$ emission.

Figure 4A:
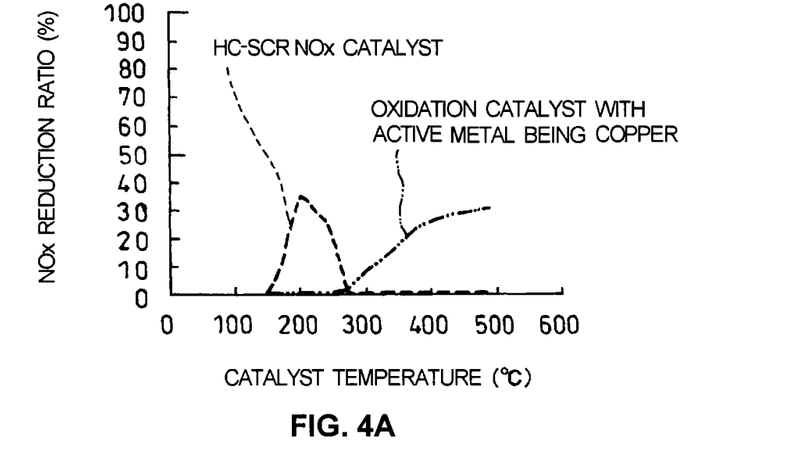
FIG. 4A is a diagram showing inherent performances of an HC-SCR $NO_x$ catalyst and an oxidation catalyst with active metal being copper, respectively.
Figure 4B:
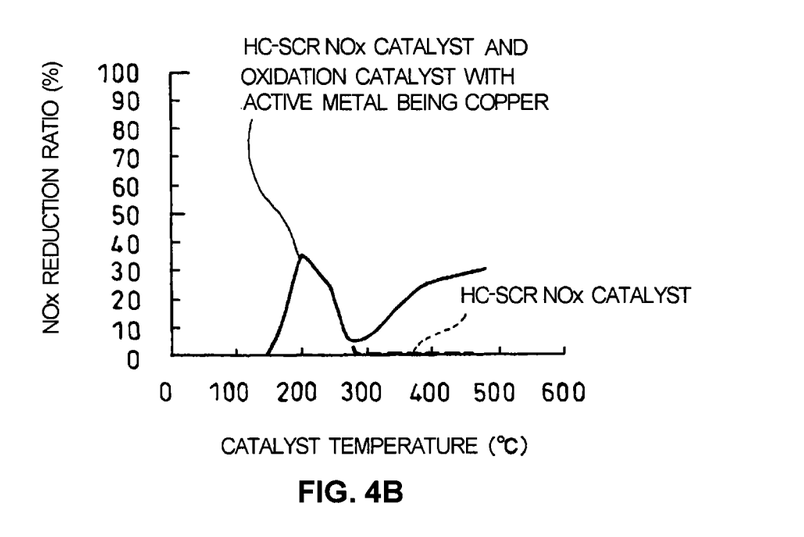
FIG. 4B is a diagram showing a relationship between a catalyst temperature and a $NO_x$ reduction ratio in the embodiment of the exhaust emission control device according to the invention (in a case where the oxidation catalyst carried by the catalyzed particulate filter is a catalyst with active metal being copper)

The HC-SCR $NO_x$ catalyst 12 and the oxidation catalyst carried by the catalyzed particulate filter 13 with active metal being copper have inherent performances respectively as shown in FIG. 4A. As in the embodiment, with temperature-based changeover control between intermittent addition and temporary rich-spike addition of fuel, an active temperature range is expanded as shown in FIG. 4B.

Figure 5A:
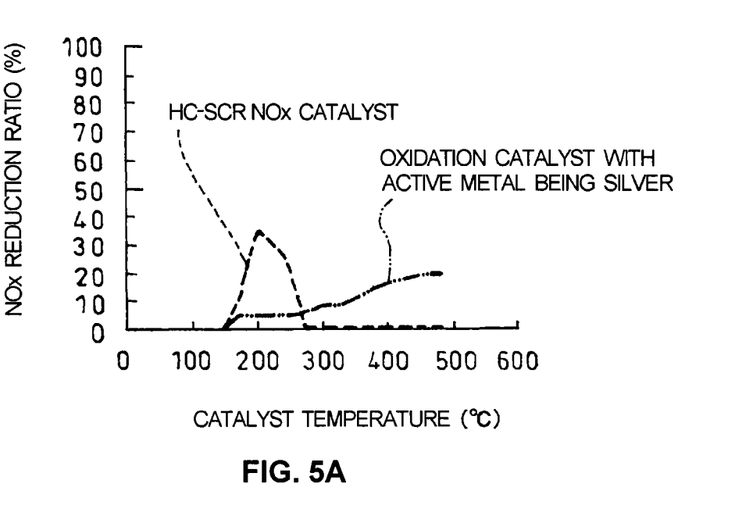
FIG. 5A is a diagram showing inherent performances of the HC-SCR $NO_x$ catalyst and an oxidation catalyst with active metal being silver, respectively.
Figure 5B:
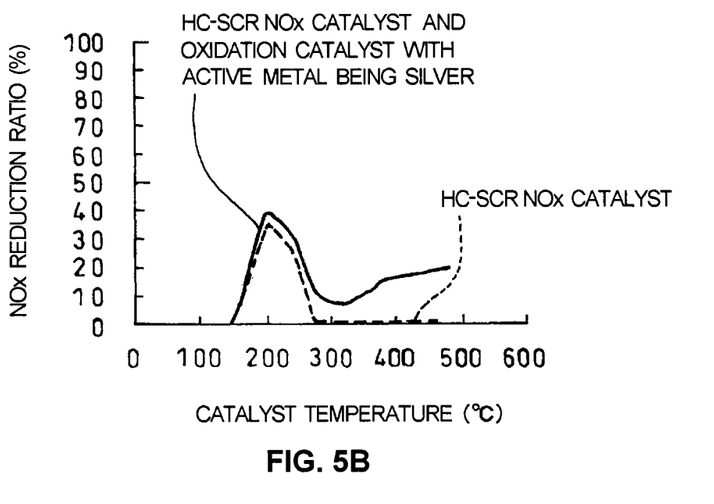
FIG. 5B is a diagram showing a relationship between the catalyst temperature and the $NO_x$ reduction ratio in the embodiment of the exhaust emission control device according to the invention (in a case where the oxidation catalyst carried by the catalyzed particulate filter is a catalyst with active metal being silver)

The HC-SCR $NO_x$ catalyst 12 and the oxidation catalyst carried by the catalyzed particulate filter 13 with active metal being silver have inherent performances respectively as shown in FIG. 5A. As in the embodiment, with temperature-based changeover control between intermittent addition and temporary rich-spike addition of fuel, an active temperature range is expanded as shown in FIG. 5B.

As a result, in comparison with conventional exhaust emission control devices, an active temperature range is expanded; exhaust emission control can be made with a wide temperature range; a $NO_x$ reduction ratio can be enhanced not only in a low and medium temperature range of about 150-300° C. but also at high temperatures not less than 300° C.

Thus, the active temperature range can be expanded; exhaust emission control can be made with a wide temperature range; and a $NO_x$ reduction ratio can be enhanced.

Figure 6:
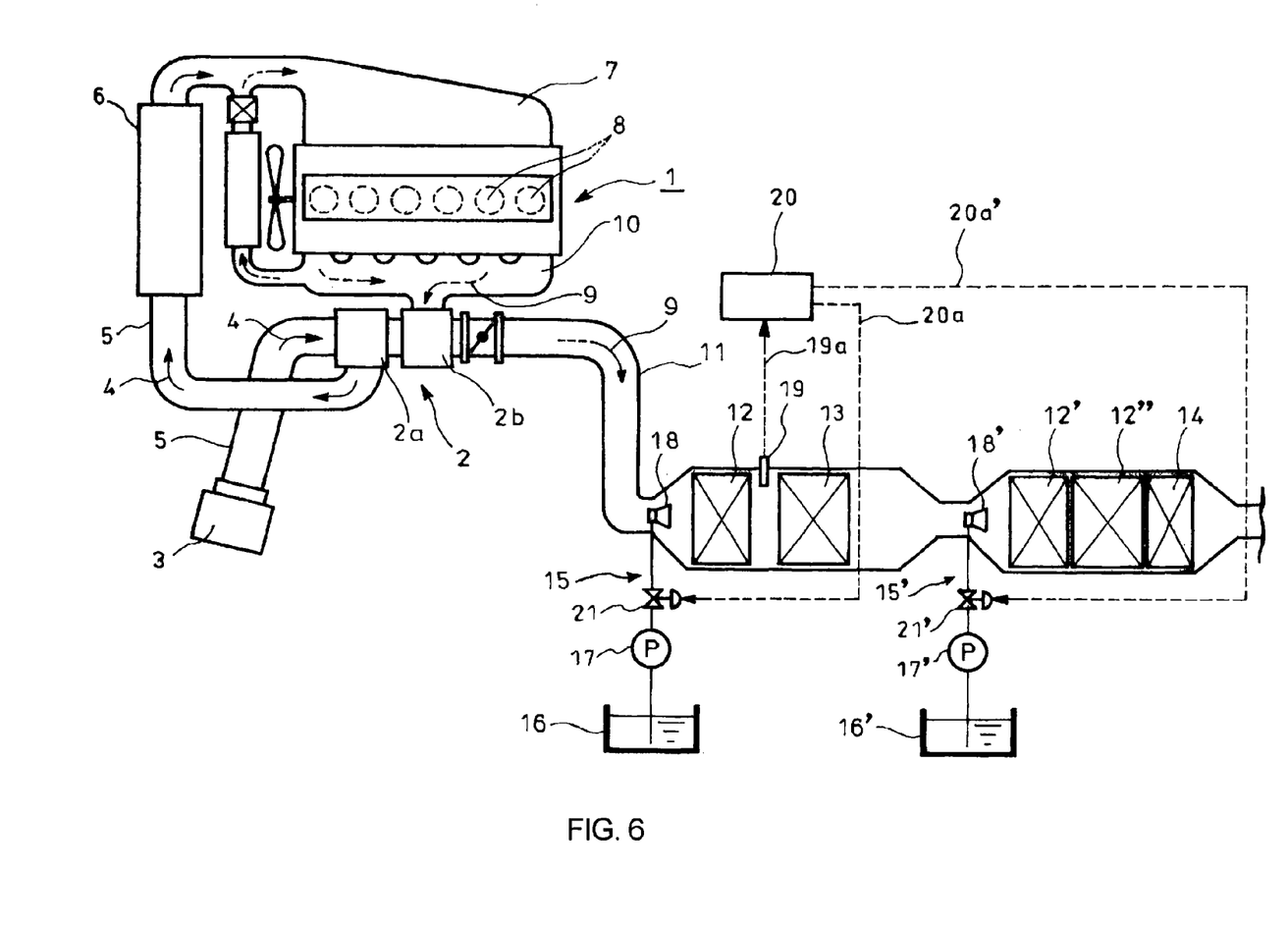
FIG. 6 is an overall schematic diagram showing a further embodiment of the exhaust emission control device according to the invention.

FIG. 6 shows a further embodiment of an exhaust emission control device according to the invention in which parts identical with those in FIG. 2 are represented by the same reference numeral. Additionally provided between the catalyzed particulate filter 13 and the downstream oxidation catalyst 14 are a fuel addition unit 15', a platinum-group-element HC-SCR $NO_x$ catalyst 12' having performance of oxidizing $NO_x$ and a platinum-group-element HC-SCR $NO_x$ catalyst 12".

The fuel addition unit 15' comprises, like the fuel addition unit 15, a fuel tank 16' for storage of the fuel, a fuel pressure pump 17' for pumping of the fuel stored in the fuel tank 16', a fuel addition nozzle 18' for spray of the fuel pumped by the fuel pressure pump 17' to an entry side of the HC-SCR $NO_x$ catalyst 12' and a control valve 21' arranged on a discharge side of the fuel pressure pump 17' and controlled in opening degree by a control signal 20a' outputted from the controller 20. The fuel stored in the fuel tank 16' is pumped, with an opening degree of the control valve 21' being controlled, by the fuel pressure pump 17' to the fuel addition nozzle 18' from which the fuel is sprayed to the exhaust gas 9 having passed through the catalyzed particulate filter 13; in the HC-SCR $NO_x$ catalysts 12' and 12", HC decomposionally produced from the fuel is reacted with $NO_x$ in the exhaust gas 9 to further make reduction of $NO_x$ emission, and HC, CO and the like in the exhaust gas 9 are oxidatively removed by the downstream oxidation catalyst 14.

With the structure shown in FIG. 6, further reduction of $NO_x$ emission can be attained.

It is to be understood that an exhaust emission control device according to the invention is not limited to the above embodiments and various changes and modifications may be made without departing from the scope of the invention.

INDUSTRIAL APPLICABILITY

An exhaust emission control device according to the invention can be utilized for a vehicle with a diesel engine.

REFERENCE SIGNS LIST 1 diesel engine
9 exhaust gas
11 exhaust pipe
12 HC-SCR $NO_x$ catalyst
13 catalyzed particulate filter
14 downstream oxidation catalyst
15 fuel addition unit
19 temperature sensor
19a temperature
20 controller
20a control signal
21 control valve
Q set flow rate
Q' flow rate
T set temperature

The invention claimed is:

1. An exhaust emission control device, comprising:
an HC-SCR $NO_x$ catalyst incorporated in an exhaust pipe for discharge of exhaust gas from a diesel engine and that reduces $NO_x$ at temperatures lower than a set temperature,
a catalyzed particulate filter arranged downstream of said HC-SCR $NO_x$ catalyst and integrally carrying an oxidation catalyst that reduces $NO_x$ at temperatures not lower than said set temperature,
a downstream oxidation catalyst arranged downstream of said catalyzed particulate filter,
a fuel addition unit for additively supplying the fuel to the exhaust gas on an entry side of said HC-SCR $NO_x$ catalyst,
a temperature sensor for measuring a temperature at between said HC-SCR $NO_x$ catalyst and said catalyzed particulate filter, and
a controller for outputting a control signal to said fuel addition unit so as to intermittently additively supply fuel with a set flow rate to said HC-SCR $NO_x$ catalyst when the temperature measured by said temperature sensor is lower than the set temperature and so as to make temporary rich-spike addition of the fuel with a flow rate not lower than said set flow rate to make arrival thereof at said catalyzed particulate filter when the temperature measured by said temperature sensor is not lower than the set temperature,
wherein said set temperature is 300° C.

2. The exhaust emission control device as claimed in claim 1, wherein said HC-SCR $NO_x$ catalyst is a catalyst with active metal being a platinum group element, and the oxidation catalyst carried by said catalyzed particulate filter is a catalyst with active metal being copper.

3. The exhaust emission control device as claimed in claim 1, wherein said HC-SCR $NO_x$ catalyst is a catalyst with active metal being a platinum group element, and the oxidation catalyst carried by said catalyzed particulate filter is a catalyst with active metal being silver.

* * * * *